(12) United States Patent
Anand et al.

(10) Patent No.: US 12,496,213 B2
(45) Date of Patent: Dec. 16, 2025

(54) THERMALLY ACTIVATED PESSARY

(71) Applicant: Beth Israel Deaconess Medical Center, Inc., Brookline, MA (US)

(72) Inventors: Mallika Anand, Brookline, MA (US); Ara Nazarian, Wellesley, MA (US)

(73) Assignee: Beth Israel Deaconess Medical Center, Inc., Boston, MA (US)

( * ) Notice: Subject to any disclaimer, the term of this patent is extended or adjusted under 35 U.S.C. 154(b) by 874 days.

(21) Appl. No.: 17/445,778

(22) Filed: Aug. 24, 2021

(65) Prior Publication Data

US 2022/0054303 A1    Feb. 24, 2022

Related U.S. Application Data

(60) Provisional application No. 63/069,490, filed on Aug. 24, 2020.

(51) Int. Cl.
*A61F 6/08* (2006.01)
*A61F 2/00* (2006.01)
*A61F 6/12* (2006.01)
*A61F 13/26* (2006.01)

(52) U.S. Cl.
CPC .............. *A61F 6/08* (2013.01); *A61F 2/0009* (2013.01); *A61F 2/005* (2013.01); *A61F 6/12* (2013.01); *A61F 13/26* (2013.01); *A61F 2210/0014* (2013.01); *A61F 2210/0023* (2013.01); *A61F 2210/0028* (2013.01); *A61F 2210/0033* (2013.01); *A61F 2230/0091* (2013.01)

(58) Field of Classification Search
CPC .... A61F 6/08; A61F 6/12; A61F 2/005; A61F 2/0009; A61F 2210/0014; A61F 2210/0019; A61F 2210/0023; A61F 2210/0028; A61F 2210/0033; A61F 13/26
See application file for complete search history.

(56) References Cited

U.S. PATENT DOCUMENTS

| 3,952,737 | A | 4/1976 | Lipfert et al. |
| 6,503,190 | B1 * | 1/2003 | Ulmsten ................ A61F 2/005 128/834 |
| 6,796,973 | B1 | 9/2004 | Contente et al. |
| 7,892,163 | B2 | 2/2011 | Bartning et al. |
| 8,211,005 | B2 | 7/2012 | Cox et al. |

(Continued)

FOREIGN PATENT DOCUMENTS

| EP | 0247837 A2 | 12/1987 |
| EP | 3616660 A1 | 3/2020 |

(Continued)

OTHER PUBLICATIONS

International Search Report and Written Opinion for Application No. PCT/US2022/041369, dated Feb. 17, 2023, 19 pages.

(Continued)

*Primary Examiner* — Keri J Nelson
(74) *Attorney, Agent, or Firm* — McCarter & English, LLP

(57) ABSTRACT

A system, method, and apparatus to insert and remove a thermally activated vaginal pessary, by employing a nitinol core material that is integrated into the construction of the thermally activated vaginal pessary and configured to increase in radial size upon contact with body temperature by undergoing a configurational phase change in the underlying nitinol core material.

20 Claims, 4 Drawing Sheets

(56) References Cited

U.S. PATENT DOCUMENTS

| | | | |
|---|---|---|---|
| 8,366,766 B2 | 2/2013 | Berreklouw | |
| 8,753,258 B2 | 6/2014 | Bartning et al. | |
| 9,050,183 B2 | 6/2015 | Bartning et al. | |
| 9,717,582 B2 | 8/2017 | Arcand et al. | |
| 10,004,584 B2 | 6/2018 | Bartning et al. | |
| 10,022,210 B2 | 7/2018 | O'Hern et al. | |
| 11,185,438 B2 | 11/2021 | Sopher et al. | |
| 11,246,596 B2 | 2/2022 | Soutorine et al. | |
| 2003/0069628 A1* | 4/2003 | Solem | A61F 2/958 623/1.11 |
| 2003/0158511 A1* | 8/2003 | Shue | A61F 13/26 604/60 |
| 2014/0107402 A1 | 4/2014 | Arcand et al. | |
| 2014/0138367 A1* | 5/2014 | Zhang | B23K 35/30 219/137 WM |
| 2015/0265329 A1* | 9/2015 | Lalonde | A61B 18/02 606/21 |
| 2025/0090368 A1 | 3/2025 | Anand et al. | |

FOREIGN PATENT DOCUMENTS

| | | |
|---|---|---|
| EP | 3854352 A1 | 7/2021 |
| WO | 2000/13624 A2 | 3/2000 |
| WO | 2014/127270 A1 | 8/2014 |
| WO | 2018/037412 A1 | 3/2018 |
| WO | 2018/140192 A1 | 8/2018 |
| WO | 2021/255724 A1 | 12/2021 |

OTHER PUBLICATIONS

Behl et al., Temperature-memory polymer actuators. Proc Natl Acad Sci U S A. Jul. 30, 2013;110(31):12555-9.

Bhattacharyya et al., Thermoelectric Cooling of Shape Memory Alloy Actuators: Theoretical Modeling and Experiment. SPIE. 1994;2427:198-217.

Degeratu et al., Thermal study of a shape memory alloy (SMA) spring actuator designed to insure the motion of a barrier structure. J Therm Anal Calorim. 2013;111:1255-1262.

Xu et al., A Three-Dimensional Constitutive Modeling for Shape Memory Alloys Considering Two-Way Shape Memory Effect and Transformation-Induced Plasticity. Cornell University, arXiv:1812.10466v1, 12 pages, (2018).

Invitation to Pay Additional Fees for Application No. PCT/US2022/041369, dated Nov. 23, 2022, 11 pages.

CooperSurgical, Milex Gehrung Folding Pessary. CooperSurgical, Inc., 4 pages, Dec. 2023.

Jones et al., Pessary Use in Pelvic Organ Prolapse and Urinary Incontinence. Rev Obstet Gynecol. 2010;3(1):3-9.

* cited by examiner

THERMALLY ACTIVATED PESSARY

CLAIM OF PRIORITY

This application claims the benefit of priority to U.S. Provisional Application Ser. No. 63/069,490, filed Aug. 24, 2020, which is incorporated herein by reference in its entirety.

TECHNICAL FIELD

The present application relates generally to a vaginal pessary for managing pelvic organ prolapse (POP) and stress urinary incontinence (SUI), and more particularly relates to a vaginal pessary that may be easily inserted and removed by a patient as needed, thereby facilitating improved hygiene, comfort, and thus reducing common pessary related issues and complications.

BACKGROUND

The pelvic floor is a group of muscles, ligaments and connective tissues that together support the pelvic organs. In women, the pelvic floor muscles and their surrounding fasciae form a support system to keep the bladder, the rectum and the uterus in place. These muscles and fasciae are attached to the fixed framework of the pelvic bones.

Pelvic organ prolapse (POP) and stress urinary incontinence (SUI) occur when the pelvic floor muscles are weakened thereby allowing one or more of the pelvic organs to push against the weakened wall of the vagina. Although not life-threatening, POP and SUI may have significant effects related to urinary, sexual, and colorectal functions, adversely affecting quality of life. For women with significant pelvic floor symptoms, the management of POP and/or SUI consists of surgical reconstruction or vaginal pessaries.

Vaginal pessaries (i.e., plastic or silicone devices that are inserted into the vagina to help support the vaginal walls and pelvic organs) are used for POP and/or SUI reduction in women who prefer conservative, non-surgical treatment. Periodic removal of these devices, however, is necessary to maintain good hygiene and to reduce or eliminate complications caused at least in part by the prolonged presence of these devices in the vagina. Such complications including irritation, erosion, bleeding and malodorous discharge. Ideally, pessaries should be removed on a daily basis.

An issue with existing pessary designs is that removal is often uncomfortable and painful and requires the pessary to be manually squeezed or bent in order to be inserted or removed from the body, thus making self-insertion and removal difficult if not impossible, particularly for elderly patients. As a result, most patients are required to rely on lifelong regular office visits every month for removal, inspection and cleaning, and reinsertion, often resulting in painful abrasions of the vaginal introitus.

It is the object of the present invention to provide a vaginal pessary that avoids the drawbacks associated with these prior art designs.

BRIEF DESCRIPTION OF THE DRAWINGS

Some embodiments are illustrated by way of example and not limitation in the figures of the accompanying drawings in which.

DETAILED DESCRIPTION

Figure 1:
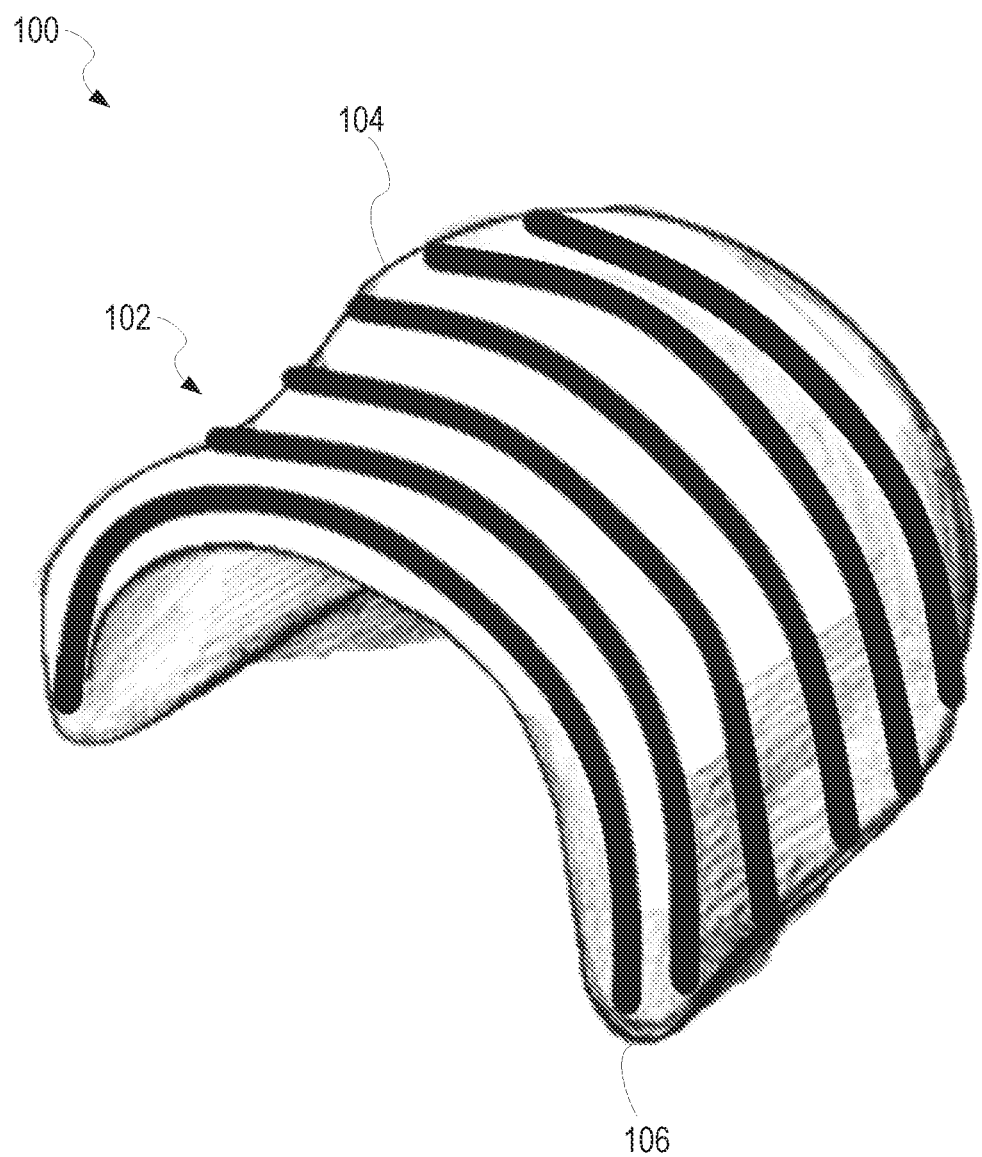
FIG. 1 is a diagram illustrating a thermally activated vaginal pessary in position upon a surface of a patient's vaginal wall, according to certain example embodiments.

Example methods and systems for a thermally activated pessary and insertion device. In the following description, for purposes of explanation, numerous specific details are set forth in order to provide a thorough understanding of example embodiments. It will be evident, however, to one skilled in the art that the present invention may be practiced without these specific details. The description is not to be taken in a limiting sense but is made merely for the purpose of illustrating the general principles of the invention, since the scope of the invention is best defined by the appended claims.

Embodiments of the present invention provide a system, method, and apparatus to provide a thermally activated vaginal pessary that employs a nitinol core material that is integrated into the construction of the thermally activated vaginal pessary and configured to increase in radial size upon contact with body temperature by undergoing a configurational phase change in the underlying nitinol core material. In some example embodiments, the thermally activated vaginal pessary may comprise one or more integrated sensor devices configured to communicate with a client device, including but not limited to: one or more pH analysis sensors; one or more pressure sensors, which may include a piezoresistive strain gauge, or capacitive pressure sensor; one or more volume sensors; one or more microbial sensors; a drug elution dispenser; and one or more sensors to provide sacral spinal nerve root 3 washout signal. Accordingly, portions of one or more integrated sensor devices may be embedded within a vaginal pessary, including but not limited to the thermally activated vaginal pessary.

The thermally activated vaginal pessary comprises a flexible outer surface composed of a biocompatible material, such as silicone or another polymer, and an inner core of a shape-memory metal alloy (Nitinol), wherein contact with internal body temperature at the time of insertion causes the inner core to undergo a configurational phase change from its martensitic phase to its austenitic phase, resulting in a physical change in shape that causes the thermally activated vaginal pessary to expand (increase in radial size) and press against the surfaces of the vaginal wall, thereby providing support.

In certain embodiments, the thermally activated vaginal pessary may include an applicator device configured to cool the nitinol core material of the thermally activated vaginal pessary, causing the thermally activated vaginal pessary to shrink in radial size for the purposes of easier insertion or retraction. For example, the applicator device may comprise a cooling wand that comprises a manually operated clamp configured to squeeze the thermally activated vaginal pessary while cooling the nitinol core material in order to shrink the radial size of the inner core, for removal of the pessary from the patient's vaginal cavity.

In some embodiments, the nitinol core material of the thermally activated vaginal pessary may comprise a series of nitinol ribs to be aligned in series, hemi-cylindrically, or in some embodiments may comprise a continuous spiral of nitinol helical elements along a long axis. In certain embodiments, the nitinol ribs may be connected to one another by a non-phase changing element keeping the inter-element distance constant. Accordingly, the individual components of the nitinol core may themselves be treated using a specific method based on a desired transformation result.

The treatment method may comprise a treatment temperature and a treatment duration. Accordingly, different nitinol properties may be achieved by applying different treatment processes. For example, in some embodiments, the nitinol components may be treated at a treatment temperature of 805° Celsius (C), and a treatment duration of 5 minutes. In further embodiments, the nitinol components may be treated at a treatment temperature of 550° C., and a treatment duration of 5 minutes. In further embodiments, the nitinol components may be treated at a treatment temperature of 400° C. and a treatment time of 5 minutes. In further embodiments, the nitinol components may be treated at a treatment temperature of 805° C., and a treatment duration of 30 minutes.

In some embodiments, the treatment processes described above may also include one or more quench cycles, wherein the nitinol components are rapidly cooled in water, oil, or air. In some embodiments, the treatment process may comprise a combination of multiple treatment process cycles. For example, as an illustrative example, the treatment process for a particular nitinol component may comprise an initial treatment temperature of 805° C. for a treatment duration of 30 minutes, followed by a first quench, followed by a subsequent treatment temperature of 550° C. at a treatment duration of 5 minutes and a second quench.

Figure 2:
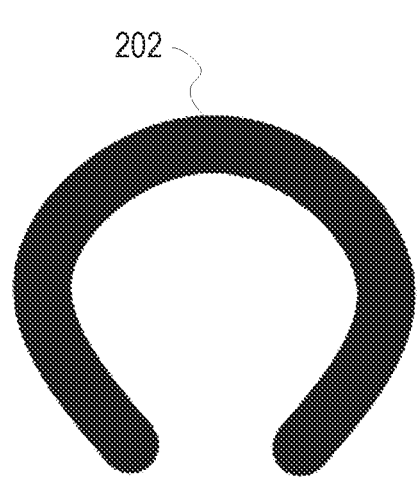
FIG. 2 is a diagram illustrating an applicator for a thermally activated vaginal pessary, according to certain example embodiments.
Figure 2:
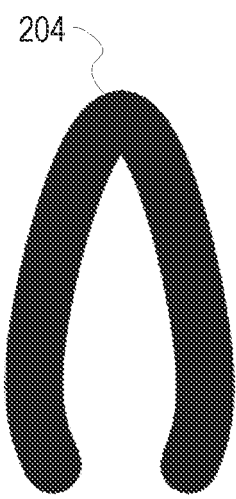
Figure 3:
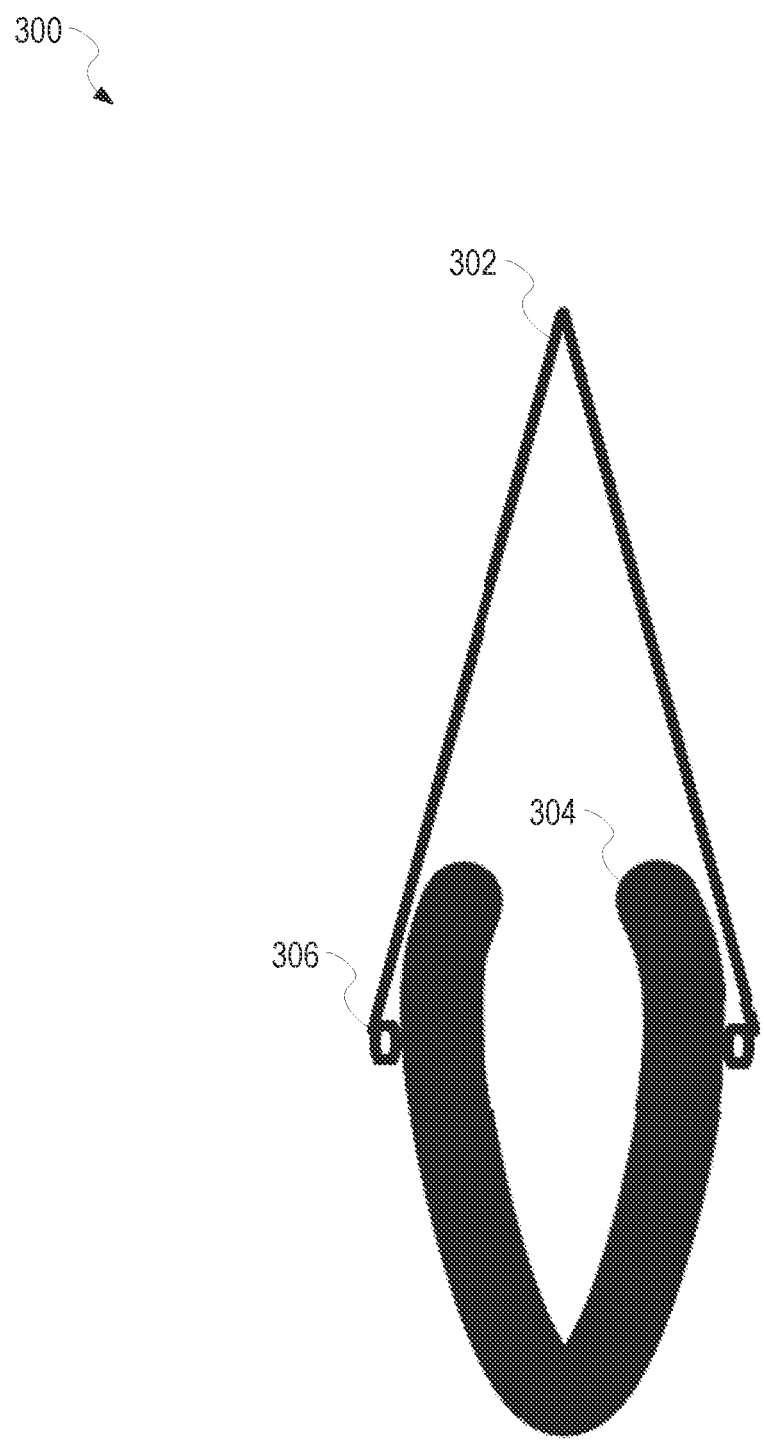
FIG. 3 is a diagram illustrating an applicator for a thermally activated vaginal pessary, according to certain example embodiments.

For purposes of non-limiting illustration, the drawings of FIGS. 1, 2, and 3 generally depict certain example embodiments of a thermally activated vaginal pessary.

FIG. 1 provides a diagram 100 of a thermally activated vaginal pessary 102 that comprises an outer surface 104, and a set of nitinol core elements (i.e., ribs) 106, which may be enclosed within the outer surface 104, according to certain example embodiments. In some embodiments, the set of nitinol ribs 106 may be arranged in parallel, hemi-cylindrically. In some embodiments, the set of nitinol ribs 106 may be a continuous spiral of nitinol helical elements along a long axis of the thermally activated vaginal pessary 102.

FIG. 2 provides a diagram 200 of phases of a thermally activated vaginal pessary, according to certain example embodiments. As depicted in the diagram 200, a first phase 202 of a thermally activated vaginal pessary (such as the thermally activated vaginal pessary 102 depicted in FIG. 1). For example, the first phase 202 may correspond with an austenitic phase of the thermally activated vaginal pessary. Similarly, a second phase 204 of the thermally activated vaginal pessary may occur when the thermally activated vaginal pessary is cooled (i.e., a temperature of the thermally activated vaginal pessary is reduced). Accordingly, the second phase 204 may correspond with a martensitic phase of the thermally activated vaginal pessary.

According to certain example embodiments, the thermally activated vaginal pessary may transition from the first state 202 to the second state 204 by reducing a temperature of a nitinol ribs disposed within the thermally activated vaginal pessary (i.e., the nitinol ribs 106).

FIG. 3 provides a diagram 300 illustrating arms 302 of an applicator for a thermally activated vaginal pessary, according to certain example embodiments. As seen in the diagram 300, the arms 302 of an applicator may be configured to compress a thermally activated vaginal pessary 304 for insertion into a patient.

According to certain example embodiments, the arms 302 of the applicator device may include one or more cooling elements 306 configured to contact with an inner core of the thermally activated vaginal pessary 304, causing a phase change of the thermally activated vaginal pessary 304, as depicted in FIG. 2. For example, the applicator device may cool the nitinol core material of the thermally activated vaginal pessary 304, causing the thermally activated vaginal pessary 304 to shrink in radial size for the purposes of easier insertion or retraction. For example, the applicator device may comprise a cooling wand that comprises a manually operated clamp (that comprises the arms 302) configured to squeeze the thermally activated vaginal pessary while cooling the thermally activated vaginal pessary 304. For example, the cooling elements 306 may comprise thermoelectric coolers.

Figure 4:
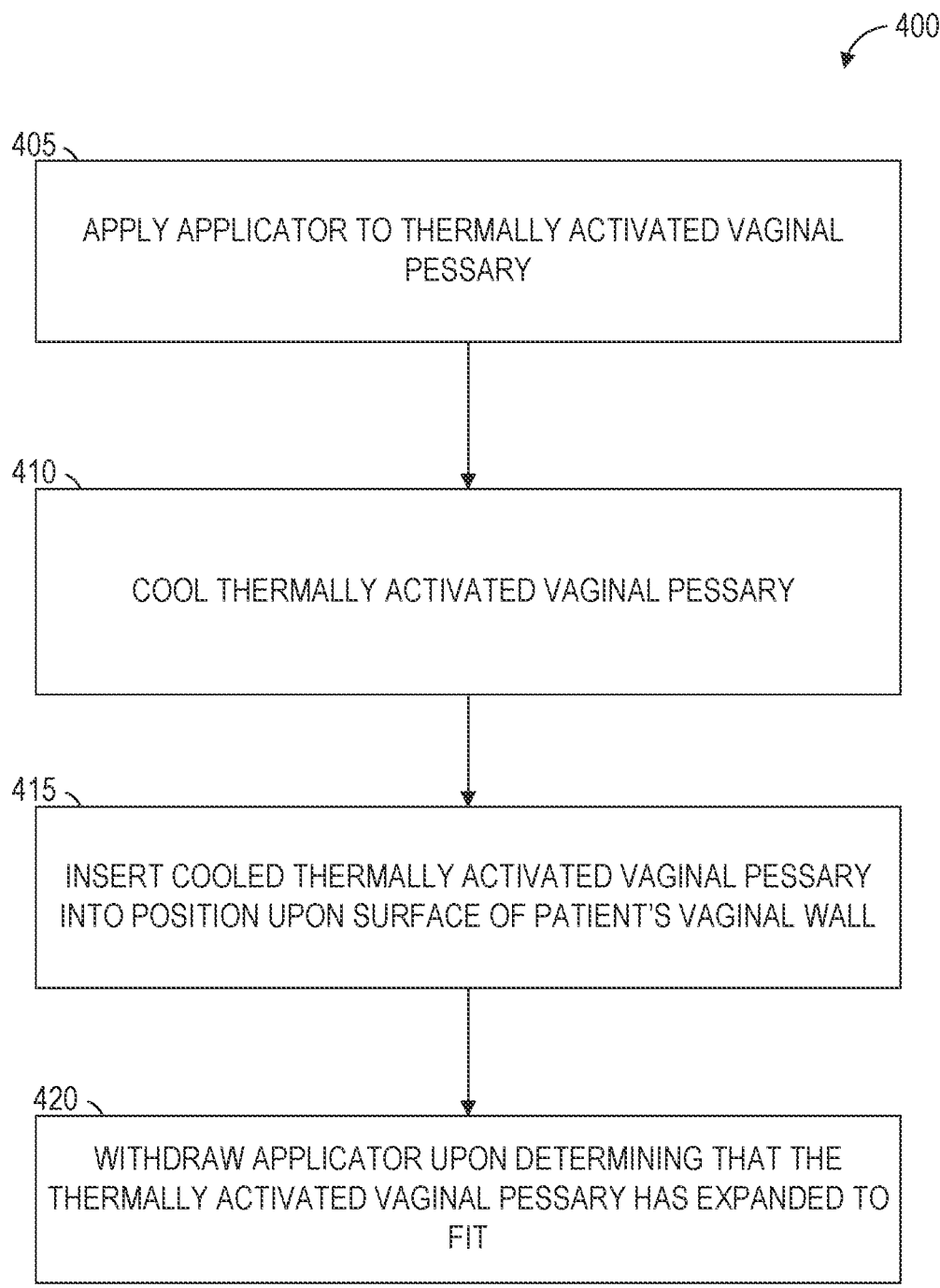
FIG. 4 is a flowchart depicting a method of inserting a thermally activated vaginal pessary, according to certain example embodiments.

FIG. 4 depicts a method 400 of inserting a thermally activated vaginal pessary, according to certain example embodiments. As shown in FIG. 4, the method 400 may comprise operations 405, 410, 415, and 420.

At operation 405, the applicator is applied to the thermally activated vaginal pessary. According to certain embodiments discussed herein, the applicator may comprise one or more cooling elements, such as a thermoelectric cooler.

At operation 410, a temperature of the thermally activated vaginal pessary is reduce by the one or more cooling elements of the applicator, causing a nitinol core of the thermally activated vaginal pessary to change from a first phase to a second phase, wherein the second phase of the nitinol core elements corresponds with a reduction in radial size as compared with the first phase.

At operation 415, the thermally activated vaginal pessary is inserted into position upon a surface of a patient's vaginal wall. Upon determining that the thermally activated vaginal pessary has been inserted into an appropriate position as determined by an attending nurse of physician, the cooling elements of the applicator device may be disabled in order to allow the patient's body temperature to warm the thermally activated vaginal pessary.

At operation 420, the applicator may be withdrawn upon determining that the thermally activated vaginal pessary has expanded into position. In some embodiments, the applicator may include a thermocouple configured to determine when the inner core elements of the thermally activated vaginal pessary have reached a threshold temperature. For example, upon determining that the threshold temperature has been reached, a notification element associated with the applicator may display a notification indicating that the applicator may be removed. In some embodiments, the notification element may include a Light Emitting Diode (LED), or a speaker configured to emit a predefined tone.

What is claimed is:

1. A thermally actuated vaginal pessary comprising:
an applicator device that comprises a cooling element and a clamp having a pair of arms;
an outer surface of the vaginal pessary comprised of a biocompatible material and configured in a hemi-cylindrical shape such that the pair of arms are configured to contact the vaginal pessary to cool and radially compress the vaginal pessary for placement within, or removal from, a vagina of a body wherein the outer surface of the vaginal pessary extends along a long axis to contact surfaces of the vaginal wall to treat prolapse of surrounding tissue; and an inner core of the vaginal pessary having a plurality of aligned ribs comprised of a shape-memory alloy wherein the cooled vaginal pessary is configured to increase in radial size in response to a warmer body temperature.

2. The vaginal pessary of claim 1, wherein the hemi-cylindrical shape is configured to expand in response to the body temperature upon placement along the vaginal wall.

3. The vaginal pessary of claim 1, wherein the plurality of aligned ribs of the inner core of the vaginal pessary comprises a set of hemi-cylindrical nitinol ribs that radially expand at the body temperature to treat at least one of the prolapse and stress incontinence.

4. The vaginal pessary of claim 1, wherein the inner core of the vaginal pessary comprises a plurality of nitinol elements extending along the long axis.

5. The vaginal pessary of claim 1, wherein the cooling element of the applicator device comprises a thermoelectric cooler.

6. The vaginal pessary of claim 1, wherein the biocompatible material comprises silicone.

7. The vaginal pessary of claim 1, wherein the inner core of the vaginal pessary comprises a set of nitinol core elements.

8. The vaginal pessary of claim 7, wherein the set of nitinol core elements are treated at a temperature of 805° C. at a treatment duration of 5 minutes.

9. The vaginal pessary of claim 7, wherein the set of nitinol core elements are treated at a temperature of 550° C. at a treatment duration of 5 minutes.

10. The vaginal pessary of claim 7, wherein the set of nitinol core elements are treated at a temperature of 400° C. at a treatment duration of 5 minutes.

11. The vaginal pessary of claim 7, wherein the set of nitinol core elements are treated at a temperature of 805° C. at a treatment duration of 30 minutes.

12. The vaginal pessary of claim 1 further comprising a notification element to communicate a threshold temperature to a user.

13. The vaginal pessary of claim 1 further comprising a temperature sensor.

14. The vaginal pessary of claim 1 wherein the pair of arms has a first arm and a second arm to contact the inner core within the outer surface.

15. The vaginal pessary of claim 1 wherein the vaginal pessary has a first state and a second state and a transition temperature to change states.

16. A thermally actuated vaginal pessary comprising:
a vaginal pessary having an outer surface of a biocompatible material with a hemi-cylindrical shape that is configured to radially compress for manual placement in, or removal from, a vagina of a body; and
wherein the vaginal pessary has an inner core supporting the biocompatible material, the inner core having the hemi-cylindrical shape with a plurality of aligned and spatially separated ribs that comprise a shape-memory alloy wherein the ribs are configured to contract in a radial direction at a cooling temperature and expand in a radial direction at a warmer body temperature to treat prolapse of surrounding tissue.

17. The vaginal pessary of claim 16, further comprising a cooling element that cools the shape-memory alloy to a temperature below a body temperature.

18. The vaginal pessary of claim 17, wherein the cooling element comprises a plurality of arms configured to grasp the outer surface and manually compress the vaginal pessary for placement in the body.

19. The vaginal pessary of claim 16, wherein the shape memory material further comprises a nitinol material having a threshold temperature for transition between a first state and a second state.

20. The vaginal pessary of claim 16, wherein the outer surface is configured to press upon opposing surfaces of the vaginal wall to treat at least one of the prolapse and stress incontinence.

* * * * *